C. C. HARBRIDGE.
DEMOUNTABLE RIM.
APPLICATION FILED DEC. 18, 1912.
1,189,446.
Patented July 4, 1916.
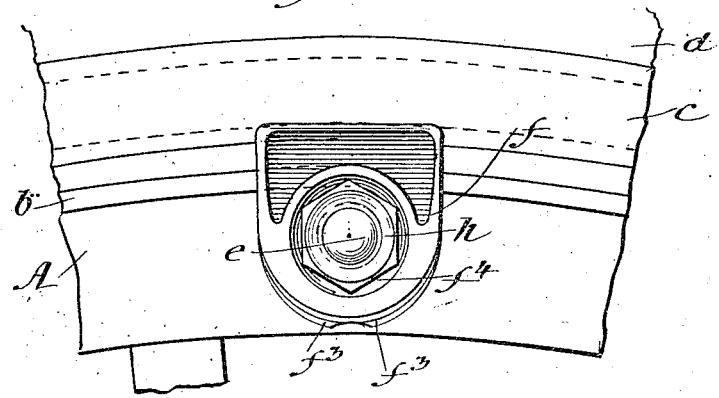
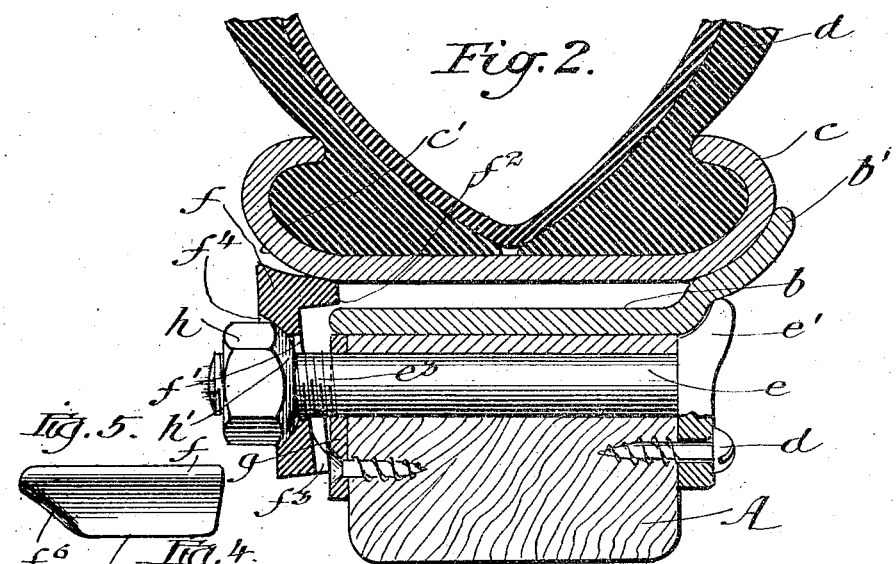
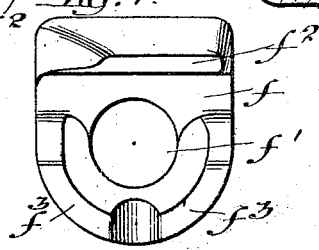
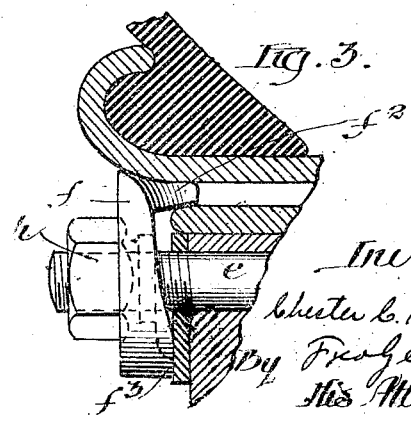

UNITED STATES PATENT OFFICE.

CHESTER C. HARBRIDGE, OF DETROIT, MICHIGAN, ASSIGNOR TO DETROIT DEMOUNTABLE RIM CO., OF DETROIT, MICHIGAN, A CORPORATION OF MICHIGAN.

DEMOUNTABLE RIM.

1,189,446.  Specification of Letters Patent.  Patented July 4, 1916.

Application filed December 18, 1912. Serial No. 737,394.

*To all whom it may concern:*

Be it known that I, CHESTER C. HARBRIDGE, a resident of Detroit, in the county of Wayne and State of Michigan, have invented certain new and useful Improvements in Demountable Rims, of which the following is a full, clear, and exact description.

The present invention relates to demountable rims for pneumatic tires and more particularly to the devices for detachably clamping the tire rim to the wheel.

Heretofore, in bolting on demountable rims, it has been customary to provide a connection between the clamping-lug and the nut of each attaching device, which would cause the clamp to move longitudinally in both directions with the nut, to force it into, as well as out of, engagement with the rim. In practice, it has been found that the clamps, when thus connected to the nuts, would not be easily forced into and out of position between the demountable rim and the band on the wheel, because of the resultant cramping of the clamp while being forced into position, the demountable rim being usually springy or flexible, particularly when a split rim is employed.

The present invention designs to provide an improved device which avoids this cramping between the clamp and the nut and the resultant cramping between the nut and the bolt, and also to avoid the necessity of connecting the lug and nut by a flange or groove or means for causing the nut to withdraw the lug. This object is attained by providing spherical bearing surfaces between the nut and the clamp which permit the clamp to readily accommodate itself to the rim, as the clamp is forced into clamping position. The side of the rim is usually curved where it is seated on the clamp and exerts sufficient pressure upon the clamp to make the use of special nut-locking means unnecessary and also causes the lug to follow the nut when the latter is turned to release the rim.

The invention consists in the novel features hereinafter set forth and more particularly defined by claims at the conclusion hereof.

In the drawings: Figure 1 is a side elevation of a portion of a wheel and a rim embodying the invention. Fig. 2 is a transverse section, the clamp being shown in the position assumed before it has been forced into position to secure the rim. Fig. 3 is a section showing the clamp after being drawn into position to secure the rim. Fig. 4 is an inner face view of one of the lugs. Fig. 5 is a plan view of the same.

$A$ denotes the usual felly of a wheel, $b$ the band fixed thereon having a flange $b'$ at one side which forms a seat for one side of the demountable rim $c$ which is adapted to receive and hold a pneumatic tire $d$. The rim $c$ may be of usual or suitable construction and is adapted to be removed from the wheel for a purpose well understood in the art. The particular form of the wheel felly and band form no part of the present invention, and may also be of any suitable construction. The rim $c$ with the tire thereon is removable laterally from the wheel and is secured on its seat on the flange $b'$ by clamps $f$ in suitable number, each of which is secured by a nut $h$ on a bolt $e$.

Each bolt $e$ has a suitably formed integral head $e'$ at one end for engaging the felly and the flange $b'$ of band $b$, and extends transversely through the felly $A$. A screw $d$ extends through head $e'$ and serves to secure the bolt against rotation in the felly. Each clamp $f$ has an opening $f'$ through which bolt $e$ is adapted to pass, the opening being larger than the bolt to permit the lug to swing vertically and relatively to the bolt. The clamp has a wedge-tongue $f^2$ which is adapted to be forced between one side of band $b$ and the corresponding side of the rim $c$, the latter being curved as at $c'$, where it is adapted to seat upon the clamp. A bearing-plate $g$ for each clamp is secured to felly $A$ and is adapted to be engaged by the lugs $f^3$ at the lower end of the clamp $f$. The outer face of the clamp is formed with a spherically concave bearing-surface $f^4$ which is adapted to be engaged by a correspondingly convex bearing-surface $h'$ on nut $h$, which is screw-threaded to engage a corresponding thread $e^3$ on bolt $e$.

When the rim $c$ has been placed in position on the wheel, as shown in Fig. 2, the clamps $f$ are forced inwardly by the nuts. Initially the clamps meet resistance by rim $c$ and the clamps will be disposed angularly with respect to the plane of rotation of the nut, lugs $f^3$ being seated on plate $g$ and the narrow edge of wedge-tongues $f^2$ will be disposed for entry into the space between the rim $c$ and band $b$. Despite this angular position, there will be an evenly distributed bearing between the clamp and the nut, since the spherical bearing-surfaces prevent any cramping between the clamp and the nut. As each clamp is forced into position to cause it to fit snugly against the rim at $e'$ the clamp will be free to tilt about its bearing where it engages the plate $g$ and therefore excessive force in turning the nut will not be necessary in securing the clamp by the nut. In practice, the spring in the rim either when it is a complete annulus or split, will, when the nut is turned to release the rim, exert pressure upon the clamp which will cause it to follow the nut instead of remaining in its holding position. Furthermore, the spherical bearing surfaces between the nut and the clamp serve to frictionally hold the nut against rotation and thus render nut-locking means unnecessary.

The tongue $f^2$ of the clamp is cut off angularly as at $f^6$ at one end to permit the clamp to be turned to an inverted position when it has been loosened from the rim. The spherical bearing-surfaces permit the clamp to be turned at an acute angle with respect to the axis of the bolt, and resultantly, when the nut has been moved outwardly a short distance, the clamp may be rotated and the cut-away portion $f^6$ permits the clamp to clear the rim so that a comparatively short movement of the nut will release the clamp, so it can be turned.

It will be understood that any desired number of bolts and clamps may be provided for each rim, as well understood in the art.

The invention is not to be understood as restricted to the details set forth, since these may be modified within the scope of the appended claims without departing from the spirit and scope of the invention.

Having thus described the invention, what I claim as new and desire to secure by Letters Patent is:

1. A clamp for securing a demountable rim on a wheel composed of a side portion and an integral wedge tongue projecting from said side portion and having a bolt hole through said side portion and a spherical bearing surface around said hole.

2. A clamp for securing a demountable rim on a wheel composed of a side portion and an integral wedge tongue projecting from said side portion and having a bolt hole through said side portion and a spherical recess around said hole and on the outer side thereof.

3. A clamp for securing a demountable rim on a wheel composed of a side portion and an integral wedge tongue projecting from said side portion and having a bolt hole through said side portion, a spherical bearing surface on said side portion and around said hole, and an inwardly projecting bearing lug at the inner end of said side portion.

4. The combination of a wheel body, a demountable tire rim for the wheel, bolts secured in the wheel and clamps for the rim, each comprising a side portion and an integral projecting wedge tongue to pass between the wheel body and the rim and having a bolt hole in said side portion, nuts on said bolts, the nuts and side portions having spherical engaging surfaces around the bolts.

5. The combination of a wheel body, a demountable tire rim for the wheel, bolts secured in the wheel and clamps for the rim, each comprising a side portion and an integral projecting wedge tongue to pass between the body and the rim and having a bolt hole in said side portion, nuts on said bolts, said side portions having spherical recesses around the bolts, said nuts having spherical surfaces fitting into said recesses.

CHESTER C. HARBRIDGE.

Witnesses:
MILDRED STUMPF,
FRED GERLACH.